us009015309B2

United States Patent
Duxbury et al.

(10) Patent No.: US 9,015,309 B2
(45) Date of Patent: Apr. 21, 2015

(54) NETWORKED PROBE SYSTEM

(75) Inventors: Neil Duxbury, Clanfield Bampton Oxfordshire (GB); Andrew Reeve, Winchester Hampshire (GB)

(73) Assignee: Roke Manor Research Limited, Romsey Hampshire (GB)

( * ) Notice: Subject to any disclaimer, the term of this patent is extended or adjusted under 35 U.S.C. 154(b) by 119 days.

(21) Appl. No.: 13/387,903

(22) PCT Filed: Jun. 28, 2010

(86) PCT No.: PCT/GB2010/051063
§ 371 (c)(1),
(2), (4) Date: Apr. 9, 2012

(87) PCT Pub. No.: WO2011/012873
PCT Pub. Date: Feb. 3, 2011

(65) Prior Publication Data
US 2012/0191850 A1 Jul. 26, 2012

(30) Foreign Application Priority Data

Jul. 29, 2009 (GB) .................................. 0913180.6

(51) Int. Cl.
*G06F 15/173* (2006.01)
*H04L 29/06* (2006.01)
*H04L 12/26* (2006.01)

(52) U.S. Cl.
CPC ............ *H04L 63/1408* (2013.01); *H04L 43/12* (2013.01)

(58) Field of Classification Search
None
See application file for complete search history.

(56) References Cited

U.S. PATENT DOCUMENTS

| 5,521,907 | A | 5/1996 | Ennis, Jr. et al. |
| 6,785,237 | B1 | 8/2004 | Sufleta |
| 2002/0170004 | A1 | 11/2002 | Parrett et al. |
| 2003/0225549 | A1 | 12/2003 | Shay et al. |
| 2005/0270982 | A1* | 12/2005 | McBeath ...................... 370/252 |
| 2010/0226278 | A1* | 9/2010 | Borsos et al. ................. 370/253 |

FOREIGN PATENT DOCUMENTS

WO 2003061201 7/2003
WO 2005109754 A1 11/2005

OTHER PUBLICATIONS

Giuseppe Ateniese et al., Survivable Monitoring in Dynamic Networks, Journal, Sep. 1, 2006, 1242-1254, vol. 5 No. 9, IEEE Service Center, Los Alamitos, CA.
UK Search Report, App. No. GB0913180.6, Oct. 29, 2009.
International Search Report, App. No. PCT/GB2010/051063, Nov. 8, 2010.

* cited by examiner

*Primary Examiner* — Quang N Nguyen
*Assistant Examiner* — Padma Mundur
(74) *Attorney, Agent, or Firm* — Banner & Witcoff, Ltd.

(57) ABSTRACT

A networked probe system for a communications network (28) comprising at least one user device and at least one network device, comprises a plurality of probes (25). A probe (25) is provided in each path between the or each user device and the or each network device. Each probe (25) stores one or more parameters of interest. The probes (25) monitor communication from the user device for a subset of the communication satisfying the one or more parameters. On determining the presence of the one or more parameters in the subset of the communication, the probe (25) provides a notification to all other probes in the network (28).

19 Claims, 3 Drawing Sheets

NETWORKED PROBE SYSTEM

CROSS-REFERENCE TO RELATED APPLICATIONS

This application is a U.S. National Stage application under 35 U.S.C. §371 of International Application PCT/GB2010/051063 (published as WO 2011/012873 A1), filed Jun. 28, 2010, which claims priority to Application EP 0913180.6, filed Jul. 29, 2009. Benefit of the filing date of each of these prior applications is hereby claimed. Each of these prior applications is hereby incorporated by reference in its entirety.

This invention relates to a networked probe system for a communications network and a method of monitoring communication in a network and has particular application in the field of network surveillance.

A high proportion of electronic communication is in the form of email and webMail is becoming increasingly popular. Network surveillance may be carried out using probes which are equipment that are capable of copying and then analysing all or part of the communication information, for example in packet or bitstream form, traversing a link or a network node, normally without disrupting or modifying in any way the nature of the communications taking place. A capability to decode emails is important, but for webMail this is expensive in terms of processing resource in the probe. Media on the internet has a high computation cost to process in an IP probe, particularly if the data is compressed or complex. Processing the data takes too many CPU cycles in a probe which has only a fixed amount of CPU. If processing cannot take place at a suitable rate, the data can be buffered, but this is also limited and once the buffer runs out, then data is dropped and lost.

The present invention provides a system and method as defined in the appended claims.

The invention addresses the requirement of reducing the processing resource required by the probe, by only monitoring for and decoding a subset of the data which is transferred in the communication network, limited to communication received from the type of source of response of interest. Specifically, the invention allows the optimisation of decode of emails downloaded from a webMail server, or similar sources of responses in a communication network, by using client to server communications to determine what subsequent server to client communications will be and which ones to process.

An example of a system and method according to the present invention will now be described with reference to the accompanying drawings in which.

The examples of the present invention which are described below are given with particular reference to a webmail transaction, but the invention is applicable to any situation where a request-response sequence takes place on different paths and where the request can provide an identifier of a source of a subsequent response, so that responses from that particular source can be monitored. Another example of this type of situation is the use of multi-protocol label switching (MPLS), where a packet sent between two endpoints includes in its header a label indicating the communication path to which the packet belongs. A probe monitoring such communications can extract the label and use this in monitoring for responses. The particular labels to be applied at set up are stated in a signalling message. Other examples of communication types to which the invention can be applied include Voice over Internet Protocol (VoIP) signalling, where messages to set up calls are on a different path to those for conversation, or instant messaging of various types, such as MSN Messenger, or Office Communicator. Another example is the use of AJAX on pages where there are a lot of graphics, so that instead of down-loading the page to the user, a program is sent, so that the page can be recreated on the user's computer. However, although suitable for a personal computer, any sort of format change uses a lot of the probe's resources.

Figure 1:
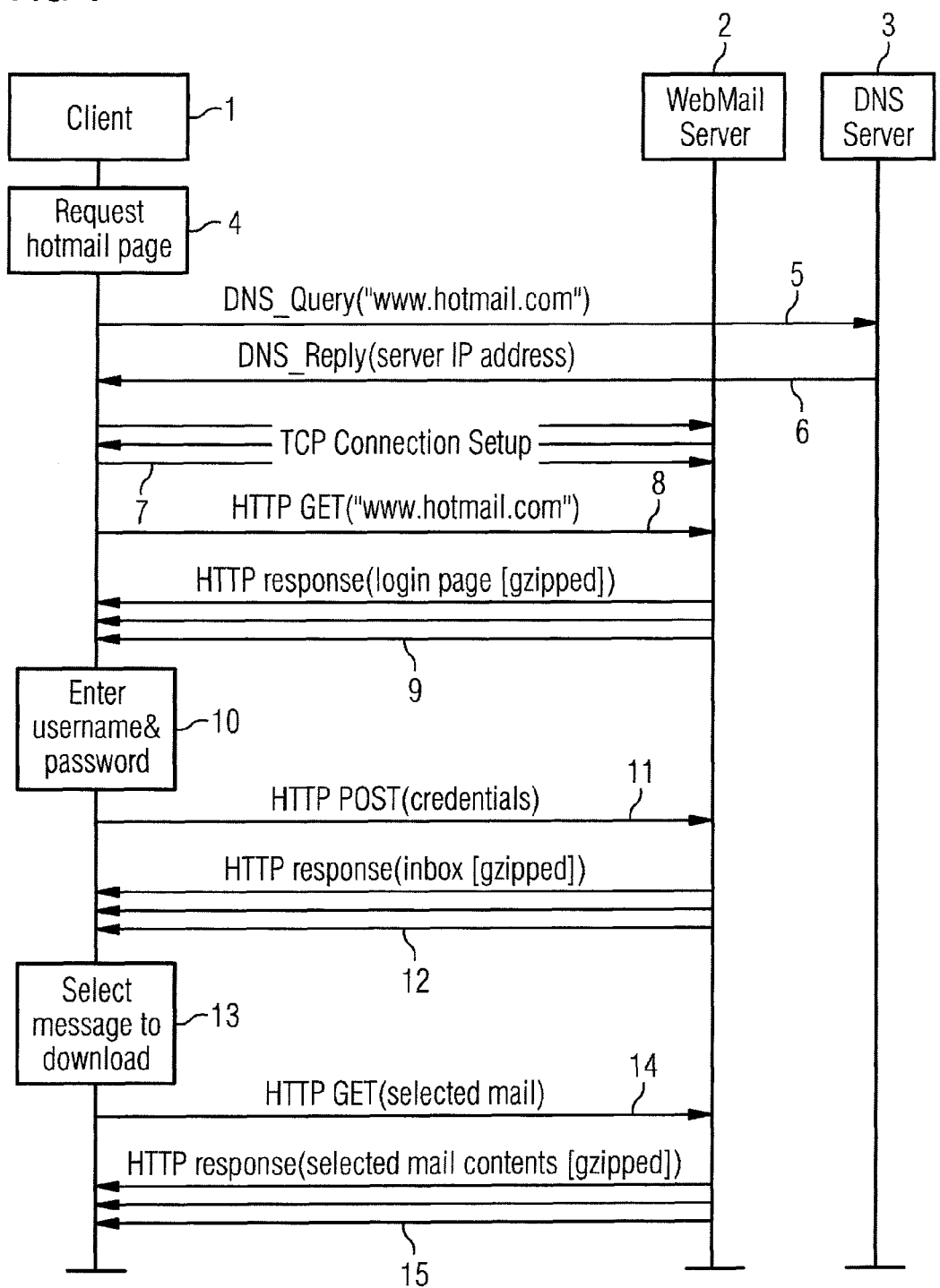
FIG. 1 illustrates message exchange in a conventional webmail transaction.

An outline of a typical message sequence in order for a user to download an incoming email is given in FIG. 1. This figure shows, at a high level, the protocol exchanges that take place when a user logs into her email account and reads a message from the inbox. In this example, the user has a Hotmail (Live Mail) account, but the sequence would be the same or follow a similar pattern for other providers. The message sequence provides a simplified view because it does not show low level TCP acknowledgement messages.

An example of the sequence of events for exchanges between a client 1, a webmail server 2 and a domain name server 3 is as follows. The user requests 4 that the browser download a Hotmail home page which has the URL "www.hotmail.com". A DNS Query message 5 is sent to the DNS server 3 in order to find the IP address for "www.hotmail.com". The DNS server responds with a DNS Reply 6 providing the IP address of the server hosting the Hotmail service. The browser carries out a TCP connection setup 7 to open a TCP connection with the webmail server 2. The browser sends an HTTP GET 8 to the webmail server for the Hotmail home page. The webmail server returns the Hotmail login page in a response 9 in the form of several messages, which have been gzipped. The user enters 10 her user name and password. The browser sends an HTTP POST 11 containing the user's credentials to the webmail server 2. The webmail server authenticates the user and sends back a page displaying the contents of her inbox, in the form of several messages 12, which are gzipped. The user then selects 13 an email to read from her inbox and the browser sends an HTTP GET 14 for the selected mail to the Hotmail server. The webmail server 2 responds with the contents of the mail, in the form of several messages 15, gzipped.

In order to detect the receipt of an email and analyse it, it is necessary to detect the HTTP response 15 containing the email and then decode the contents of the response 15. There are a number of technical problems to overcome to achieve this, which are explained in more detail below. In general Web pages are rich in content and their size when encoding for transmission is very large. Consequently servers use a feature of the HTTP protocol which allows the web pages to be compressed using gzip for transmission across the internet. Even so, each page will occupy several packets. The pages from webMail servers are no different in this respect, since providers must present attractive pages which include sundry items such as adverts and links to other services. Gzip is a sophisticated, multi-level state-full form of compression and decoding of a webpage requires a lot of processing. Furthermore, owing to gzip's state-full nature, it is necessary to process the packets that make up a page in order, but the nature of the internet is such that reordering is commonplace and this increases the complexity of the decode process.

A very high proportion of internet traffic comprises gzipped HTTP responses, but for the purpose of network surveillance, it is desirable to limit to decode of webMail responses, whether these relate to content, or simply to the parties and time of communication. Responses are made for the purpose of the web browser rendering the page and the browser can easily associate the responses received by the browser, with the requests the browser had made earlier. However, it is difficult to limit gzip decode to webMail responses because the HTTP protocol provides no means within the response message to link the response with the response's original request, or with the server that generated the response, so that it cannot be determined that a response contains webMail until the response has been decompressed.

Figure 2:
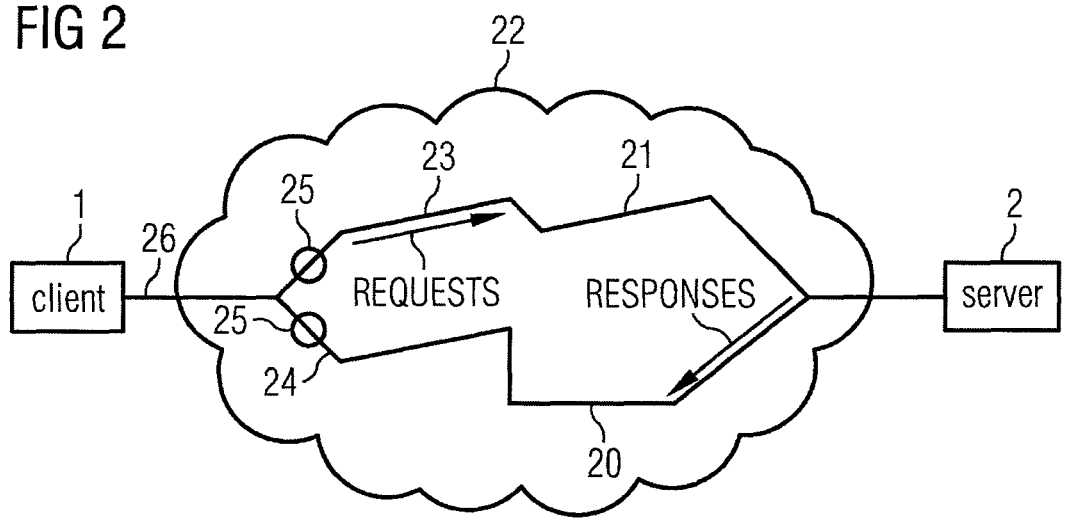
FIG. 2 illustrates the effect of diverse routing requests and responses in a communications network.

This problem is exacerbated by the phenomenon of diverse routing of requests and responses as illustrated in FIG. 2. Owing to the routing and traffic engineering policies of the networks that provide the internet 22, it can often happen that the routes 20 taken by HTTP responses 9, 15 are different to the routes 21 taken by the corresponding requests 8, 14. Network monitoring is typically performed on high-capacity links 23, 24 which are less likely than low capacity access links 26, to be common to both routes. Thus, the original requests 8, 14 are not generally available to the probe 25 decoding the webMail responses 9, 15 because they have travelled on a different path through the network and through a different probe. Furthermore, webMail is increasingly encrypted. Decryption and analysis of encrypted data is particularly expensive and it is important to target only that part of the data that contains webMail.

The present invention allows a probe to intelligently target the subset of HTTP gzipped responses which contain web-Mail and avoid the unnecessary expense of decoding the majority of responses which contain no useful information. The probe only decompresses those responses identified as coming from webMail servers, having determined their source server by means of the server's IP Source Addresses. This reduction in the number of packets which the probe has to decompress allows it to continue to operate in real time.

Figure 3:
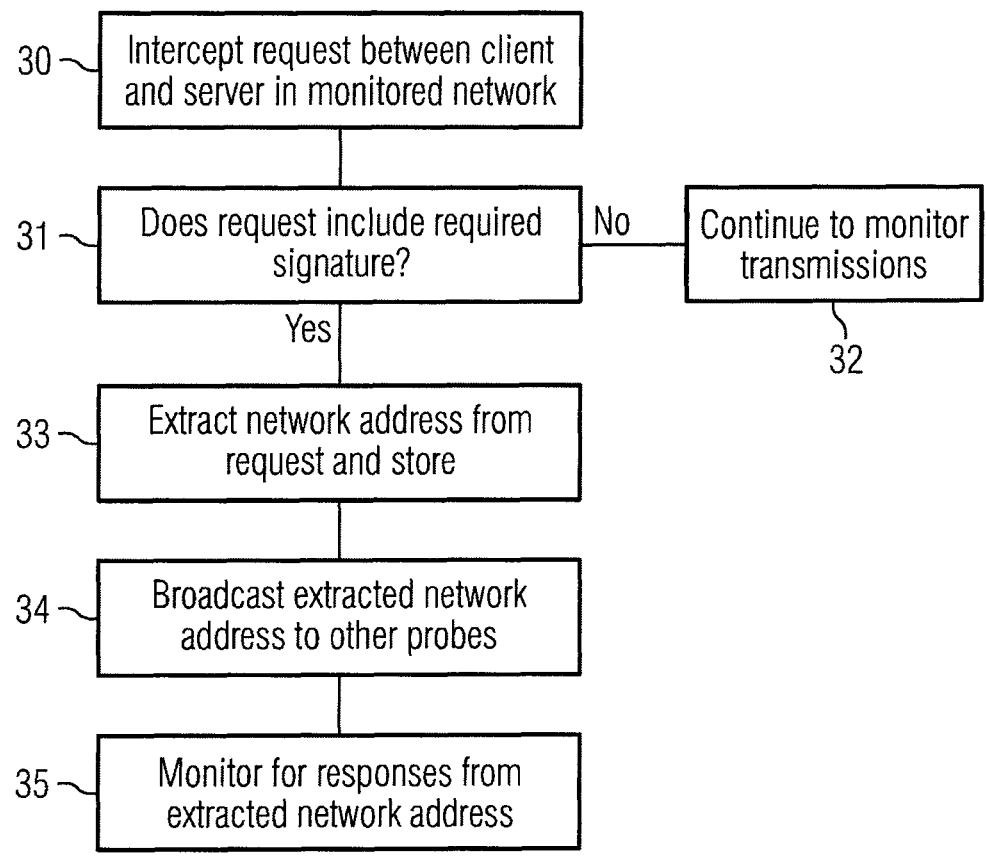
FIG. 3 is a flow diagram illustrating an example of the method of the present invention; and, FIG. 4 illustrates a networked probe system according to the present invention.

As shown in the examples of FIGS. 2 and 3, a request sent from a user client 1 to a server 2 is intercepted 30 by a probe 25. The probe determines 31 if the request includes a required signature, or other parameter which identifies the server as being of the type required, e.g. an email server, and the type of network address as being one applied to an email server, e.g. hotmail.com. If the request does not have the required signature, then the probe continues 32 to monitor traffic. If the request does include the required signature, then the probe extracts 33 and stores a network address of the destination server 2. The probe then broadcasts 34 the extracted network address to other probes in the probe network. Each of the networked probes 25 monitors 35 for the responses from the extracted network address.

Each probe has a list of the IP addresses of the active webMail servers. Whenever a packet containing a GET response 9, 15 is received, the source IP address is examined and if it matches an entry in the list, the response is decompressed and the email information is examined. The list may be created and maintained by several different methods. One option is to use explicit configuration of a list of known webMail server IP addresses. This list may be augmented, or replaced by dynamic addition of new webMail server IP addresses to the list. Another consideration is retirement of IP addresses from the list based on inactivity. Preferably an IP address is only retired if a new IP address for the corresponding mail server has been detected. For the MPLS example, lists of labels are set up or modified in a similar manner.

Figure 4:
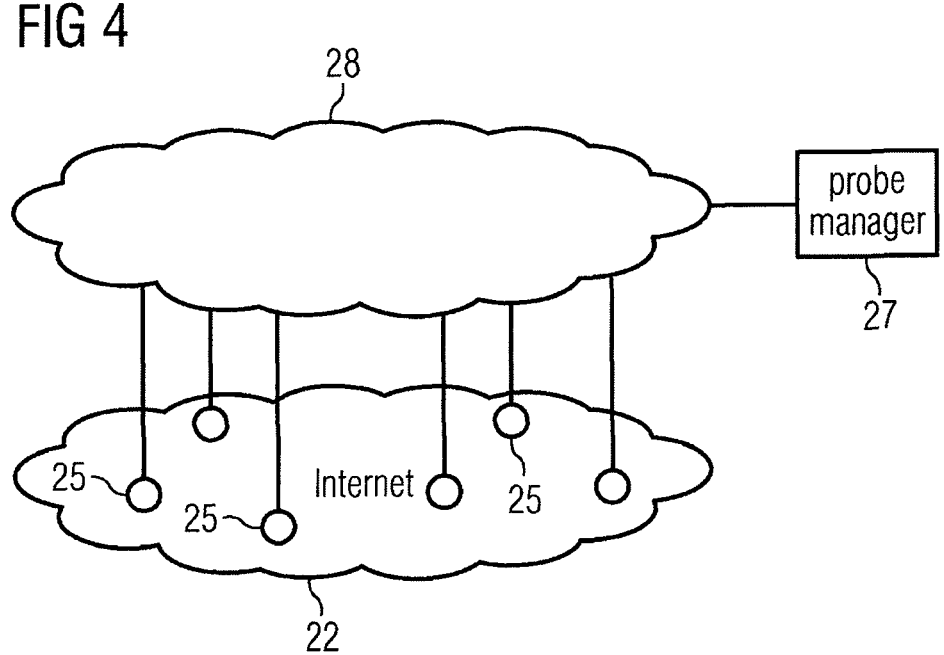

A particular feature of the present invention is that having determined a network address of interest, this information is disseminated across a network 28 connecting the probes 25 as depicted in FIG. 4. The probes 25 positioned on paths in the internet 22, together with a probe manager 27 are inter-connected by this tip-off network 28. The network supports the broadcast of messages from any member to all others, as well as the unicast of messages from one probe to another. The tip-off network 28 may be physically separate from the monitored network 22, or may use physical infrastructure of the monitored network. Each probe may hold a list of other entities to which network address information must be disseminated; alternatively the network may provide some other means of distributing the information such as multicast to all other members of a group.

When a new probe is deployed, or an existing one is restarted, the initial webMail server IP address list in each probe may optionally be populated by means of explicit configuration using a list of well known addresses. Preferably this is done by the probe manager 27 downloading the list to the probe 25 across the tip-off network 28.

In order to cater for webMail server relocation events, dynamic update of the list can be performed, as explained below. This may be in addition to, or independently of, the explicit list configuration. From time to time, webMail service providers reconfigure their servers. This can be for a number of reasons, such as to install a higher capacity server, or server farm; to move to a new location; or to connect to a different network provider. When this happens the URL for the service stays the same, but the IP address of the endpoint may change. If the new address does not belong to the list, mail from the provider will be missed by the probes.

This problem is overcome by monitoring GET requests 8, 14. In contrast to the responses 9, 15, requests are not gzipped and it is relatively easy to determine that a GET is targeting a webMail provider, or other service provider of interest. The Destination IP address of any such GET is examined and if it does not match one in the list, it is added to the probe's list and the new address is broadcast to all other probes 25 and the probe manager 27 by using the tip-off network 28. Probes receiving the broadcast add the new address to their own lists.

An example of a mechanism for determining how GETs to providers of interest are detected is given below. A set of strings (e.g. "/mail/TodayLight.aspx?") are identified which are known to be present in the URL of GET requests to webmail servers. In order to capture HTTP GET requests in the client to server direction the Probe is initially tasked with these strings, together with an optional list of destination ports.

If a packet contains a webmail server identifier and is destined for one of the ports of interest the Probe extracts the destination IP address. This IP address is the address of a webmail server and is added to the list, providing it is not already present. If it is already present the timeout of this entry is refreshed. This mechanism assumes that the IP address in the GET request is not a proxy address. The behaviour of the probe when proxy identifiers are present in the packet is determined by a configuration option.

There is a high probability that the newly discovered server IP address will be added to all lists before any response containing significant information is transmitted. Referring to FIG. 1, the server address is detected at step 8, whereas the first response containing significant information is transmitted at step 15, but this does not happen until after human client input at steps 10 and 13.

In those examples where IP addresses are monitored, the IP address can be used to determine where the server is hosted, e.g. whether it is in another country, which may have different legal requirements regarding monitoring. If new servers are installed, the IP address may change, or if additional servers are added in, there is an extra IP address for the probe to search for. In examples where Ethernet addresses are monitored, these are just numbers, so not as easily associated with a geographical location.

So as to avoid wasteful processing of GET responses from servers which used to provide webMail, but have ceased to do so, IP addresses which are detected to no longer belong to webMail servers are deleted from the probes' lists. This is achieved as follows. Each list entry has an associated time-stamp which is updated to the current time whenever a GET response is found to contain a webMail response. Each list entry has an associated Boolean potential-change-of-use flag. If a probe decodes a GET response from an address, that the probe discovers is not a webMail response, then the probe sets the potential-change-of-use flag to TRUE. Whenever a GET response is found to contain a webMail response, the probe 25 sets the potential-change-of-use flag to FALSE.

Periodically, the probe manager interrogates the status of each list entry in each probe. For each address the probe determines the most recent time that a webMail response was detected and calculates an overall inactivity time. If the probe manager determines that an address has been inactive for a period above a threshold, the probe manager instructs every probe to delete the corresponding entry. The magnitude of the threshold used depends upon whether any probe had the potential-change-of-use flag set to TRUE. If any did, a shorter threshold is used. The lower threshold is implemented in order to expedite removal of IP addresses which are causing wasted effort.

In one embodiment of the invention, tip-off is performed internally within a probe 25, so that a probe can independently detect servers and manage its webMail address list, without support from other probes or a probe manager 27. This only works if the location of the probe allows it to detect both directions of conversation (GETs and responses). Where the probe functions are distributed between different functional blocks within a probe, perhaps different processors, or different cards, tip-off may be performed between these functional blocks. A probe that performs internal tip-off can also perform tip-off to other probes via the tip-off network.

Optionally, the TCP port, or set of TCP ports (e.g. ports 80 and 8080) that is used by a particular server on an IP address will be detected and a per IP address, or per server port, filter is applied in order to limit the number of responses that need be decompressed and analysed.

In addition to its utility in providing a scalable and cost-effective solution to webMail processing by reducing the number of responses that need to be decompressed and analysed, WebMail server detection is a useful function in its own right and can provide valuable information to probe users. While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope of the present invention.

The invention claimed is:

1. A networked probe system comprising a plurality of probes, wherein each of the plurality of probes is provided in a respective path of a plurality of paths in a communications network between at least one user device and at least one network server, and wherein at least one of the plurality of probes is configured to:
  store one or more parameters associated with a server type of interest;
  monitor communications from the at least one user device for a subset of the communications including at least one of the one or more parameters associated with the server type of interest;
  provide a notification to at least one other of the plurality of probes if the at least one of the plurality of probes determines a presence of the at least one of the one or more parameters associated with the server type of interest in the subset of the communications, the notification including an identity of one of the at least one network server to which the subset of the communications was addressed;
  monitor the respective path of the at least one of the plurality of probes for additional communications from any of the at least one network server, the identity of which has been notified as the server type of interest by other of the plurality of probes; and
  decoding communication data from the any of the at least one network server having the identity notified as the server type of interest by the other of the plurality of probes.

2. The networked probe system according to claim 1, wherein each of the communications from the at least one user device is in a form of a packet data stream.

3. The networked probe system according to claim 2, wherein the subset of the communications comprises one or more packets from the packet data stream.

4. The networked probe system according to claim 1, wherein the subset of the communications is decoded in the at least one of the plurality of probes.

5. The networked probe system according to claim 1, further comprising a probe manager.

6. The networked probe system according to claim 1, further comprising an overlay network to carry the notification between the plurality of probes.

7. The networked probe system according to claim 1, wherein each of the plurality of probes comprises a store to store signature information for network servers being monitored.

8. The networked probe system according to claim 7, wherein the signature information comprises network addresses or destination ports.

9. The networked probe system according to claim 1, wherein each of the plurality of probes further comprises a buffer.

10. The networked probe system according to claim 1, wherein the notification includes a network address of the one of the at least one network server.

11. The networked probe system according to claim 10, wherein the network address comprises an internet protocol address, an Ethernet address, or a multiprotocol label switching label.

12. A method comprising:
  monitoring, using at least one of a plurality of probes, communications from at least one user device to at least one network server in a network for a subset of the communications including one or more parameters associated with a server type of interest, each of the at least one of the plurality of probes being in a respective path in the network between the at least one user device and the at least one network server;

if the subset of the communications comprises the one or more parameters associated with the server type of interest, sending a notification, including an identity of one of the at least one network server to which the subset of the communications was addressed, from the at least one of the plurality of probes to at least one other of the plurality of probes;

monitoring, with the at least one of the plurality probes, the respective path of the at least one of the plurality probes for communications from any of the at least one network server, the identity of which has been notified as the server type of interest by other of the plurality of probes; and decoding in the at least one of the plurality of probes, communication data from the any of the at least one network server having the identity notified as the server type of interest by the other of the plurality of probes.

13. The method according to claim 12, further comprising storing signature information in the plurality of probes, the signature information including network addresses or destination ports.

14. A method comprising:

using a probe to monitor a path in a network between a user device and a network server to determine whether one or more parameters associated with a server type of interest apply to a communication from the user device to the network server;

sending a notification from the probe to other probes on other paths in the network in response to a determination that the one or more parameters associated with the server type of interest apply to the communication, wherein the notification comprises an identity of the network server;

maintaining a watch on one or more of the probe and the other probes to monitor for communications from the network server having the identity in the notification; and decoding, in the one or more of the probe and the other probes, communication data from the network server having the identity comprised in the notification.

15. The method according to claim 14, wherein the communication from the user device is in a form of a packet data stream.

16. The method according to claim 15, wherein one or more parameters are comprised in one or more packets in the packet data stream.

17. The method according to claim 14, further comprising decoding with the probe the communication from the user device.

18. The method according to claim 14, further comprising sending the notification from the probe to other probes via an overlay network.

19. The method according to claim 14, wherein the notification includes a network address of the network server.

* * * * *